United States Patent [19]

Hegedus et al.

[11] Patent Number: 5,137,855
[45] Date of Patent: Aug. 11, 1992

[54] CATALYSTS FOR SELECTIVE CATALYTIC REDUCTION DENOX TECHNOLOGY

[75] Inventors: Louis Hegedus, Rockville; Jean W. Beeckman, Columbia, both of Md.; Wie-Hin Pan, Evansville, Ind.; Jeffrey P. Solar, Silver Spring, Md.

[73] Assignee: W. R. Grace & Co.-Conn., New York, N.Y.

[21] Appl. No.: 410,762

[22] Filed: Sep. 21, 1989

Related U.S. Application Data

[63] Continuation-in-part of Ser. No. 204,641, Jun. 9, 1988, Pat. No. 4,929,586.

[51] Int. Cl.$^5$ .................... B01J 21/06; B01J 21/16; B01J 23/16
[52] U.S. Cl. .................... 502/84; 502/217; 502/309; 502/350
[58] Field of Search .................... 502/217, 84, 309, 324, 502/350

[56] References Cited

U.S. PATENT DOCUMENTS

| 4,085,193 | 4/1978 | Nakajima et al. | 423/239 |
| 4,351,811 | 9/1982 | Matsuda et al. | 423/239 |
| 4,833,113 | 5/1989 | Imanari et al. | 502/309 |
| 4,859,439 | 8/1989 | Rikimaru et al. | 423/239 |
| 4,891,348 | 1/1990 | Imanari et al. | 502/309 |
| 4,929,586 | 5/1990 | Hegedus et al. | 502/217 |

FOREIGN PATENT DOCUMENTS

| 0256359 | 2/1988 | European Pat. Off. |
| 0260614 | 3/1988 | European Pat. Off. |
| 0317293 | 5/1989 | European Pat. Off. |
| 3531871 | 3/1986 | Fed. Rep. of Germany |

Primary Examiner—Carl F. Dees
Attorney, Agent, or Firm—Edward J. Cabic

[57] ABSTRACT

Catalysts for the selective catalytic reduction of NOx by ammonia are made from porous formed supports having a certain fraction of the pores with pore diameters larger than 600 Angstrom units. Thus macropores can be introduced in a formed $TiO_2$ support by adding burnout materials prior to forming the titania into the formed support. Then conventional DeNOx catalytic metals are added. Barium sulfate can be added to the surface of the porous inorganic oxide to make an improved support.

19 Claims, No Drawings

CATALYSTS FOR SELECTIVE CATALYTIC REDUCTION DENOX TECHNOLOGY

CROSS-REFERENCE TO RELATED APPLICATIONS

This application is a continuation-in-part of U.S. patent application Ser. No. 204,641 filed Jun. 9, 1988 now U.S. Pat No. 4,929,586.

BACKGROUND OF THE INVENTION

1. Field of the Invention

This invention relates to catalysts made of porous titania which may or may not contain additional ingredients such as oxides of vanadium and tungsten for the reduction of nitrogen oxides by ammonia.

2. Description of the Previously Published Art

Nitrogen oxides have been selectively reduced in the presence of ammonia and various types of catalysts.

U.S. Pat. No. 4,048,112 discloses a catalyst for the selective reduction of nitrogen oxides in exhaust gases in the presence of ammonia. The catalyst is made of vanadium oxide supported on a carrier of titanium oxide in the anatase form.

U.S. Pat. No. 4,085,193 discloses catalysts for removing $NO_x$. Among the materials disclosed are titania and at least an oxide of molybdenum, tungsten, iron, vanadium, nickel, cobalt, copper, chromium or uranium.

U.S. Pat. No. 4,010,238 discloses a process to remove $NO_x$ in the presence of ammonia and a vanadium oxide catalyst of the formula $V_xA_yO_z$ where V is vanadium, A is Cu, Zn, Sn, Pb, Ti, P, Cr, Fe Co and Ni, x and y are each a numeral of 0.5 to 12 and z is a numeral of 1 to 60.

U.S. Pat. No. 4,225,462 discloses using barium sulfate and vanadium (IV) oxide sulfate to make a water resistant catalyst for reducing nitrogen oxide with ammonia.

U.S. Pat. No. 4,176,089 discloses making high surface area, low bulk density mixed silica-titania materials useful for catalysts for the selective reduction of nitrogen oxides with ammonia. The catalysts are made by premixing the alkoxides of titanium and silicon and adding the premixed alkoxides to a hydrolysis medium so as to form a silica-titania precipitate.

U.S. Pat. No. 4,188,365 discloses a catalyst for the vapor phase reduction of nitrogen oxides with ammonia. The catalyst has a catalytic metal compound on a shaped carrier of $TiO_2$ and a clay mineral having an average particle size of 0.1 to 100 microns. The shaped carrier can also contain inorganic fibrous material and small particles of silica hydrogel and silica sol.

U.S. Pat. No. 4,221,768 discloses a process to remove nitrogen oxides with ammonia by using a catalyst made of an intimately mixed binary ($TiO_2$-$SiO_2$) or ternary $TiO_2$-$ZrO_2$-$SiO_2$) oxide with no cladding and with no co-precipitation. These binary and ternary oxides are not mere mixtures of the individual oxides.

Great Britain Pat. No. 2,149,680 discloses a catalyst for the removal of nitrogen oxides made of (A) 80 to 95% by weight of an oxide obtained by thermal treatment of either binary hydrous oxide of titanium and silicon, a binary hydrous oxide of titanium and zirconium or a ternary hydrous oxide of titanium, zirconium and silicon in the presence of sulfuric acid or ammonium sulfate, (B) from 0 to 5% by weight of vanadium oxide, and (C) from 1 to 15% by weight of an oxide of tungsten, molybdenum, tin or cerium.

U.S. Pat. No. 4,280,926 (and its divisional 4,520,124) form a slurry of 1–20 mm long fibers which can be a silica fiber with diameter of 0.1–30 microns. Then either $TiO_2$ or $Al_2O_3$ forming materials are added and a sheet is made by papermaking means. These sheets can be formed into a honeycomb structure. The sheets are then impregnated with catalytically active agents.

U.S. Pat. No. 4,113,660 discloses making a titania catalyst using a metatitanic acid sol or gel.

T. Shikada et al. in "Reduction of Nitric Oxide by Ammonia over Silica Supported Vanadium Oxide Catalysts (III). Effects of Additives" in Nenryo Hyokai Shi, vol. 58 page 1055 (1979) disclose treating silica gel with titanic sulfate solution, neutralizing with ammonia water, drying, adding vanadyl oxalate solution, drying and finally calcining in air at 350° C. for 3 hours to produce a catalyst for the reduction of nitric oxides by ammonia. They found that the amount of TiO2 required for modifying the surface of the silica is not high. A 3% level was sufficient and that as the TiO2 content increased beyond this point the activity declined.

U.S. Pat. No. 4,705,770 discloses making an attrition resistant catalyst from titanyl sulfate which can be used in a fluidized bed. Small particles are made for fluidization. There appears to be no discussion of macroporosity; all the mean pore diameters are 232 Angstrom units or less. Furthermore, they do not intend to form a shaped support which has macroporosity.

3. Objects of the Invention

It is an object of this invention to enhance the catalyst $NO_x$ removal performance and reduce the manufacturing cost of an SCR catalyst.

It is a further object of this invention to extend the catalyst life by improving the poison resistance.

It is a further object of this invention to reduce or limit the $SO_2$ oxidation activity while at the same time enhancing $NO_x$ removal activity.

It is a further object of this invention to reduce the operating temperatures for given $NO_x$ removal requirements.

It is a further object of this invention to reduce the required reactor volume for a given $NO_x$ conversion and hence simultaneously reduce the reactor pressure drop.

It is a further object of this invention to reduce the unreacted ammonia at the exit of the SCR reactor.

These and further objects will become apparent as the description of the invention proceeds.

SUMMARY OF THE INVENTION

The feasibility of NOx removal through selective catalytic reduction with $NH_3$ in the presence of $O_2$ has been known for sometime and proceeds as follows:

$$4NO + 4NH_3 + O_2 \rightarrow 4N_2 + 6H_2O$$

$$2NO_2 + 4NH_3 + O_2 \rightarrow 3N_2 + 6H_2O$$

In contrast to previous NOx removal (DeNOx) catalysts which utilize a bulk titania support, we have obtained a superior catalyst consisting of titania with the appropriate catalytic metal oxide function with the proper porosity. Based on reaction engineering principles, we have successfully mathematically modeled the overall catalytic DeNOX reaction under various conditions. Further mathematical catalyst optimization studies have led us to uncover a route to improved DeNOX catalysts. Our model predicts that catalysts having a fraction of pores larger than 600 Angstrom units will have better activities than those without these large pores. As will be described below, we have successfully obtained catalysts incorporating this porosity and, as predicted by our mathematical modeling, the DeNOX activity is superior to that of commercially available catalysts which contain very few or no pores larger than 600 Angstrom units.

The catalyst is made of titania particles with minor amounts of binders, extrusion aids, and reinforcement materials where the formed catalyst has the proper porosity in pores larger than 600 Angstrom units. The titania is present substantially in the anatase phase. The catalyst is made by depositing on the titania a metal oxide catalytic component such as $V_2O_5$, $MoO_3$, $WO_3$, $Fe_2O_3$, $CuSO_4$, $VOSO_4$, $SnO_2$, $Mn_2O_3$, $Mn_3O_4$, or mixtures thereof. Preferably the metal oxide is present in an amount from a catalytically effective amount to 25% by weight of the entire catalyst.

In another embodiment of the invention, barium sulfate is added to the $TiO_2$ to make an improved support. This can either be done by the direct addition of barium sulfate or by adding a barium compound which will form barium sulfate in situ. When a catalytic metal oxide such as $V_2O_5$ is added to make a catalyst, the DeNOX activity is greater than a similar catalyst made without the barium sulfate addition. The preferred amount of barium sulfate to be added is from 1 to 15 wt % of the formed metal oxide support.

Preferably, the surface area of the titania and catalyst is from a catalytically effective amount up to 350 m$^2$/cc, or, more preferably, one that is between 25 m$^2$/cc and 100 m$^2$cc. Preferably the pore diameter distribution of the formed body should cover the range from 0 to 100,000 Angstrom units. Preferably the support should have a micropore diameter distribution between 0 and 600 Angstrom units, more preferably between 50 and 350 Angstrom units, and a macropore diameter distribution between 600 and 100,000 Angstrom units, more preferably between 1,000 and 20,000 Angstrom units. Although the mathematical model tends to maximize the porosity, we prefer, due to the limitation of strength, a maximum total porosity of 0.80 cc/cc, or more preferably, between 0.5 and 0.75 cc/cc. The microporosity is preferably between 0.05 and 0.50 cc/cc and macroporosity preferably between 0.05 and 0.50 cc/cc.

DESCRIPTION OF THE PREFERRED EMBODIMENTS

When making the catalyst support, it is preferable to mix burnout materials with the titania particles and to then form the mixture into the desired shape such as a monolith. Examples of burnout materials are polyethylene oxide, methylcellulose, starch or flour, polyethylene or any of the polymeric microspheres or microwaxes. To aid in extrusion conventional binders, reinforcement materials, and extrusion aids such as clay, glass fibers, and polyethylene oxide can be optionally added. By these extrusion additives we intend to exclude porous inorganic oxides such as porous silica or alumina which would not be serving this function, but which would rather be replacing titania as the support. The formed catalyst support has a total porosity of up to 0.80 cc/cc of the formed catalyst which is made up of a micropore porosity (comprising pores having a pore diameter 600 Angstrom units or less) of 0.05 to 0.5 cc/cc and a macroporosity (comprising pores having diameters greater than 600 Angstrom units) of 0.05 to 0.5 cc/cc. The titania is present substantially in the anatase phase. The catalyst is made by depositing on the support a metal oxide catalytic component such as $V_2O_5$, $MoO_3$, $WO_3$, $Fe_2O_3$, $CuSO_4$, $VOSO_4$, $Mn_2O_3$, $Mn_3O_4$, or mixtures thereof. Preferably the metal oxide is present in an amount from a catalytically effective amount to 25% by weight of the entire catalyst.

The formed support is characterized by porosity which is measured in units of cc/cc. The porosity is obtained from the pore volume of the support and the bulk density. For example, for a support having a pore volume of 0.96 cc/g and a bulk density of 0.75 g/cc, the porosity would be the product of these two values which is 0.72 cc/cc.

The catalyst is made by adding to the calcined support metal oxides such as $V_2O_5$, $MoO_3$, $WO_3$, $Fe_2O_3$, $CuSO_4$, $VOSO_4$, $SnO_2$, $Mn_2O_3$, $Mn_3O_4$ or a combination thereof. The amount of the catalyst component is from a catalytically effective amount up to 25% by weight of the entire catalyst.

The catalyst may be prepared by one of several means. Thus, for example, the $TiO_2$ support can first be impregnated with $WO_3$ before or after extrusion. For this purpose, an aqueous solution of ammonium metatungstate may be used to impregnate the support to incipient wetness. The amount of ammonium metatungstate to be used depends on the desired final percentage of $WO_3$ (which may preferably range from 1 to 20 wt %). The impregnated support may then be dried and calcined for example at 500°–550° C. for 2 hours.

The support, with or without $WO_3$, can then be impregnated with other catalytic metal oxides such as $V_2O_5$ before or after the extruded body is formed. The $V_2O_5$ precursor used can be an aqueous solution of vanadyl oxalate at a concentration which is appropriate to give the final desired $V_2O_5$ content (typically 0.5–20 wt %) in the catalyst. If the impregnation is to be carried out before the extrusion, then the support powder may be impregnated to incipient wetness with the $V_2O_5$ precursor solution followed by drying (100°–150° C. for about 12 hours). The dried powder can then be used for extrusion. Alternatively, if the $V_2O_5$ is to be impregnated after the extrusion, the extruded body is first dried and calcined (for example, at 500°–550° C. for 2 hours) and then dipped in the appropriate $V_2O_5$ precursor solution. The extrusion can be carried out in a number of ways familiar to those skillful in the art.

The present catalyst is characterized by the presence of titania in the anatase phase.

The desired pore structure should have an average micropore diameter of less than 600 Angstrom units, more preferably between 50 and 350 Angstrom units and a macropore diameter distribution between 600 and 100,000 Angstrom units, more preferably between 1000 and 20,000 Angstrom units. If the titania support does not give the desired pore structure, burn-out material may be added to give the right amount of macroporosity. In the latter case, one of several burn-out materials may be used including, but not limited to, polyethylene oxide, methylcellulose, starch or flour, polyethylene or any of the polymeric microspheres or microwaxes.

In another preferred embodiment, $BaSO_4$ is added to the $TiO_2$. This appears to add sulfate in the support which is advantageous for higher activity. The barium sulfate can be added as barium sulfate or as a soluble barium salt precursor such as barium chloride, barium nitrate, barium acetate, barium hydroxide or mixtures of these salts. Conversion to barium sulfate is achieved by adding sulfuric acid.

Having described the basic aspects of our invention, the following examples are given to illustrate specific embodiments thereof.

EXAMPLE 1

This example described the preparation of a catalyst powder for extrusion.

A titania catalyst powder suitable for extrusion was prepared as follows. 1690 g of titania powder was combined with 48 g of clay and the mixture dried at 200° C. A solution of 7.57 g of vanadium oxide and 30.30 g of oxalic acid in 280 ml of water was prepared and combined with a solution of 150.9 g of ammonium tungstate in 300 ml of water. The solution was then used to impregnate the mixture of titania and clay. The product was dried at 110° C., ground, and sieved to below 80 mesh.

EXAMPLE 2

This example describes the extrusion of bodies containing macropores.

A mixture of 100 g of the powder prepared in Example 1 was made with 15 g of Methocel 20-213 (Dow Chemical Co.) and 45 ml of water. The mixture was extruded to produce ⅛" diameter cylinders which were dried and calcined at 550° C. The resultant cylinders were analyzed by mercury intrusion porosimetry and found to contain a substantial fraction of macroporosity (0.17 cc of pores with diameters greater than 600 Angstrom units/cm3 of total volume).

EXAMPLE 3

This is an example for comparison which describes the extrusion of bodies without the introduction of macroporosity.

A mixture of 100 g of the powder prepared in Example 1 was made with 2.5 g of Methocel 20-213 (Dow Chemical Co.) and 35 ml of water. The mixture was extruded to produce ⅛" diameter cylinders which were dried and calcined at 550° C. The resultant cylinders were analyzed by mercury intrusion porosimetry and found to contain only a small fraction of macroporosity (0.05 cc of pores with diameters greater than 600 Angstrom units/cm³ of total volume).

EXAMPLE 4

This example measures the activity of the extrudates of Example 2 and 3.

The activities of the extrudates described Example 2 and 3 were determined as follows. In a fixed bed reactor, about 0.3 cm³ of extrudates were charged and the fixed bed reactor was heated in a sand bath to the temperatures set forth in Table 1 below. A gas containing 1275 ppm of NO, 1275 ppm of $NH_3$, and 4% $O_2$ in $N_2$ was passed through the catalyst bed at a rate of 200 l/hr and the amount of NO removed was measured. The rate of NO removal was calculated and the results are presented in Table 1.

TABLE 1

| | Rate of NO Removal by ⅛ inch extrudates | | | |
|---|---|---|---|---|
| | Porosity (a) | | $10^{-7}$ mole NO removed/$cm^3$-sec | |
| Example | Total | Macropores | 310° C. | 380° C. |
| 2 | 0.60 | 0.17 | 9.2 | 15.4 |

TABLE 1-continued

| | Rate of NO Removal by ⅛ inch extrudates | | | |
|---|---|---|---|---|
| | Porosity (a) | | $10^{-7}$ mole NO removed/$cm^3$-sec | |
| Example | Total | Macropores | 310° C. | 380° C. |
| 3 | 0.54 | 0.05 | 6.9 | 11.0 |

(a) Porosity is defined as $cm^3$ of pore volume/$cm^3$ of total volume. Total includes all pores and macropores are those pores with diameters greater than 600 Angstrom Units.

The data in Table 1 demonstrate the improved performance obtained by the introduction of increasing amounts of macroporosity. The catalyst prepared in Example 2 differs from that in Example 3 only in the presence of the additional macroporosity and it is substantially more active than the catalyst of Example 3.

It is understood that the foregoing detailed description is given merely by way of illustration and that many variations may be made therein without departing from the spirit of this invention.

What is claimed is:

1. A catalyst for the selective removal of nitrogen oxides from exhaust and waste gases in the presence of ammonia comprising:
   (a) a formed support consisting essentially of titania particles with optional minor amounts of binders, extrusion aids, and reinforcement materials, said formed support having
      (i) a total porosity of up to 0.80 cc/cc which is made up of a micropore porosity (comprising pores having a pore diameter 600 Angstrom units or less) of 0.05 to 0.5 cc/cc and a macroporosity (comprising pores having diameters greater than 600 Angstrom units) of 0.05 to 0.5 cc/cc, and
      (ii) said titania being substantially present in the anatase phase, and
   (b) a metal oxide catalytic component deposited on said support selected from the group consisting of $V_2O_5$, $MoO_3$, $WO_3$, $Fe_2O_3$, $CuSO_4$, $VOSO_4$, $SnO_2$, $Mn_2O_3$, $Mn_3O_4$, and mixtures thereof, said metal oxide being present in an amount from a catalytically effective amount to 25% by weight of the entire catalyst.

2. A catalyst according to claim 1, wherein the metal oxide catalytic component is $V_2O_5$.

3. A catalyst according to claim 1, wherein the surface area of the catalyst is less than 350 m²/cc.

4. A catalyst according to claim 1, wherein the surface area of the catalyst is between 25 and 100 m²/cc.

5. A catalyst according to claim 1, further comprising barium sulfate in an amount of from 1-15% by weight of the formed support.

6. A catalyst according to claim 1, wherein the catalyst is shaped as a monolith, extrudate, bead, or plate.

7. A catalyst according to claim 6, wherein the catalyst is shaped as a monolith.

8. A catalyst according to claim 1, wherein the binders, extrusion aids and reinforcement materials are selected from the group consisting of clay, glass fibers, polyethylene oxide and mixtures thereof.

9. A process for making a DeNOX catalyst comprising the steps of
   (a) forming a porous shaped support from titania, particles with optional minor amounts of binders, extrusion aids, and reinforcement materials, said support having (i) a total porosity of up to 0.80 cc/cc which is made up of a micropore porosity (comprising pores having a pore diameter of 0–600 Angstrom units) of 0.05 to 0.5 cc/cc and a macroporosity (comprising pores having diameters greater than 600 Angstrom units) of 0.05 to 0.5 cc/cc, and (ii) said titania being substantially present in the anatase phase; and (b) depositing a metal oxide catalytic component on said support selected from the group consisting of $V_2O_5$, $MoO_3$, $WO_3$, $Fe_2O_3$, $CuSO_4$, $VOSO_4$, $Mn_2O_3$, $SnO_2$, $Mn_3O_4$, and mixtures thereof, said metal oxide being present in an amount from a catalytically effective amount to 25% by weight of the entire catalyst.

10. A process according to claim 9, wherein the metal oxide catalytic component is $V_2O_5$.

11. A process according to claim 9, wherein the catalyst is shaped as a monolith, extrudate, bead, or plate.

12. A process according to claim 9, further comprising barium sulfate in an amount of from 1–15% by weight of the formed support.

13. A process according to claim 9, wherein the binders, extrusion aids and reinforcement materials are selected from the group consisting of clay, glass fibers, polyethylene oxide and mixtures thereof.

14. A process for making a DeNOX catalyst comprising forming a porous shaped catalyst from titania particles having deposited thereon a metal oxide catalytic component selected from the group consisting of $V_2O_5$, $MoO_3$, $WO_3$, $Fe_2O_3$, $CuSO_4$, $VOSO_4$, $Mn_2O_3$, $SnO_2$, $Mn_3O_4$, and mixtures thereof, said metal oxide being present in an amount from a catalytically effective amount to 25% by weight of the entire catalyst, said catalyst having (i) a total porosity of up to 0.80 cc/cc which is made up of a micropore porosity (comprising pores having a pore diameter of 0–600 Angstrom units) of 0.05 to 0.5 cc/cc and a macroporosity (comprising pores having diameters greater than 600 Angstrom units) of 0.05 to 0.5 cc/cc, and (ii) said titania being substantially present in the anatase phase.

15. A process according to claim 14, wherein the metal oxide catalytic component is $V_2O_5$.

16. A process according to claim 14, wherein the DeNOX catalyst further comprises minor amounts of binders, extrusion aids, and reinforcement materials.

17. A process according to claim 14, wherein the catalyst is shaped as a monolith, extrudate, bead, or plate.

18. A process according to claim 14, further comprising barium sulfate in an amount of from 1–15% by weight of the formed support.

19. A process according to claim 14, wherein the binders, extrusion aids and reinforcement materials are selected from the group consisting of clay, glass fibers, polyethylene oxide and mixtures thereof.

* * * * *